United States Patent

Hsu

Patent Number: 6,027,215
Date of Patent: Feb. 22, 2000

[54] ELASTIC TEMPLE FOR EYEGLASSES

[76] Inventor: Ming-Ching Hsu, P.O. Box 90, Tainan City, Taiwan

[21] Appl. No.: 09/244,474

[22] Filed: Feb. 4, 1999

[51] Int. Cl.⁷ ..................................................... G02C 5/16
[52] U.S. Cl. .......................... 351/114; 351/113; 351/153; 16/228
[58] Field of Search .................................. 351/111, 114, 351/113, 119, 121, 153; 16/228

[56] References Cited

FOREIGN PATENT DOCUMENTS

WO 98/33087  7/1998  WIPO ..................................... 351/153

Primary Examiner—Huy Mai

[57] ABSTRACT

An elastic temple for eyeglasses includes a temple body, a sleeve, a compression spring and a fixing member. The temple body has a front combine member to be pivotally combined with a lens frame, fitting through the sleeve and the compression spring and the fixing member. The compression spring is contained in a rear passageway of the sleeve, and the fixing member pushes the rear end of the spring and is fixed firmly on the temple body. The sleeve can be pushed by the spring and move between the front combine member and the fixing member so that the temple body may be swung outward and back to its original position, with a screw connecting the lens frame and the elastic temple functioning as a pivot.

1 Claim, 6 Drawing Sheets

ELASTIC TEMPLE FOR EYEGLASSES

BACKGROUND OF THE INVENTION

This invention relates to an elastic temple for eyeglasses, particularly to one consisting of a temple body, a sleeve, a compression spring and a fixing member, that are easily and securely assembled together.

A known conventional elastic temple is shown in FIGS. 1 and 2, and includes a combine member 10, a sleeve 11, a coil spring 12, a bolt 13 and a temple body 14, as the main components combined together.

The combine member 10 has a female threaded hole 101 formed in a rear end and a pivot hole 100 in a front end.

The sleeve 11 is provided with a front chamber 110, and a rear chamber 111 for receiving the combine member 10, and a hole 112 provided in a wall of the rear chamber 111.

The coil spring 12 fits around the shaft portion of the bolt 13, located in the rear chamber 111 of the sleeve 11. The coil spring 12 has its rear end resting against a head 131 of the bolt 13, and a front end resting against a bottom end of the front chamber 110 of the sleeve 11.

The bolt 13 has male threads 130 formed on a front end and engaging the female threaded hole 101 of the combine member 10. The bolt 13 fits through the coil spring and extends forward through the front chamber 110 of the sleeve 11 and engages the female threaded hole 101 of the combine member 10.

The temple body 14 has a front chamber 140 for the sleeve 11 to extend therein, and a threaded hole 141 in a wall of the front chamber 140 aligned with the hole 112 of the sleeve 11 for receiving a screw N to to assemble the temple body 14 with the sleeve 11, this finishing assembly of the known conventional elastic temple.

However, the known conventional elastic temple has the following disadvantages:

1. The temple and the sleeve have to be combined together with the screw N, thus taking time and is, not economical.
2. The screw N is liable to loosen off.
3. The structure is rather complicated, thus resulting in high cost.

SUMMARY OF THE INVENTION

The aim of the invention is to offer an elastic temple with a simple structure which is easily and securely assembled.

The feature of the invention is a temple body with a front combine member pivotally connected to a lens frame, a sleeve located in the temple body and contacting the front combine member and having a front semi-cylindrical portion and a rear tubular portion with a center passageway, a compression spring fitting around the temple body and located in the center passageway of the sleeve, and a fixing member fitting around and fixed immovably with the temple body and having a front smaller outer diameter portion fitted in the center passageway of the sleeve and pushing the compression spring. Thus, the elastic temple may be swung outward and back to its original position by means of elasticity of the compression spring and with a screw connecting the lens frame and the temple functioning as a pivot.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
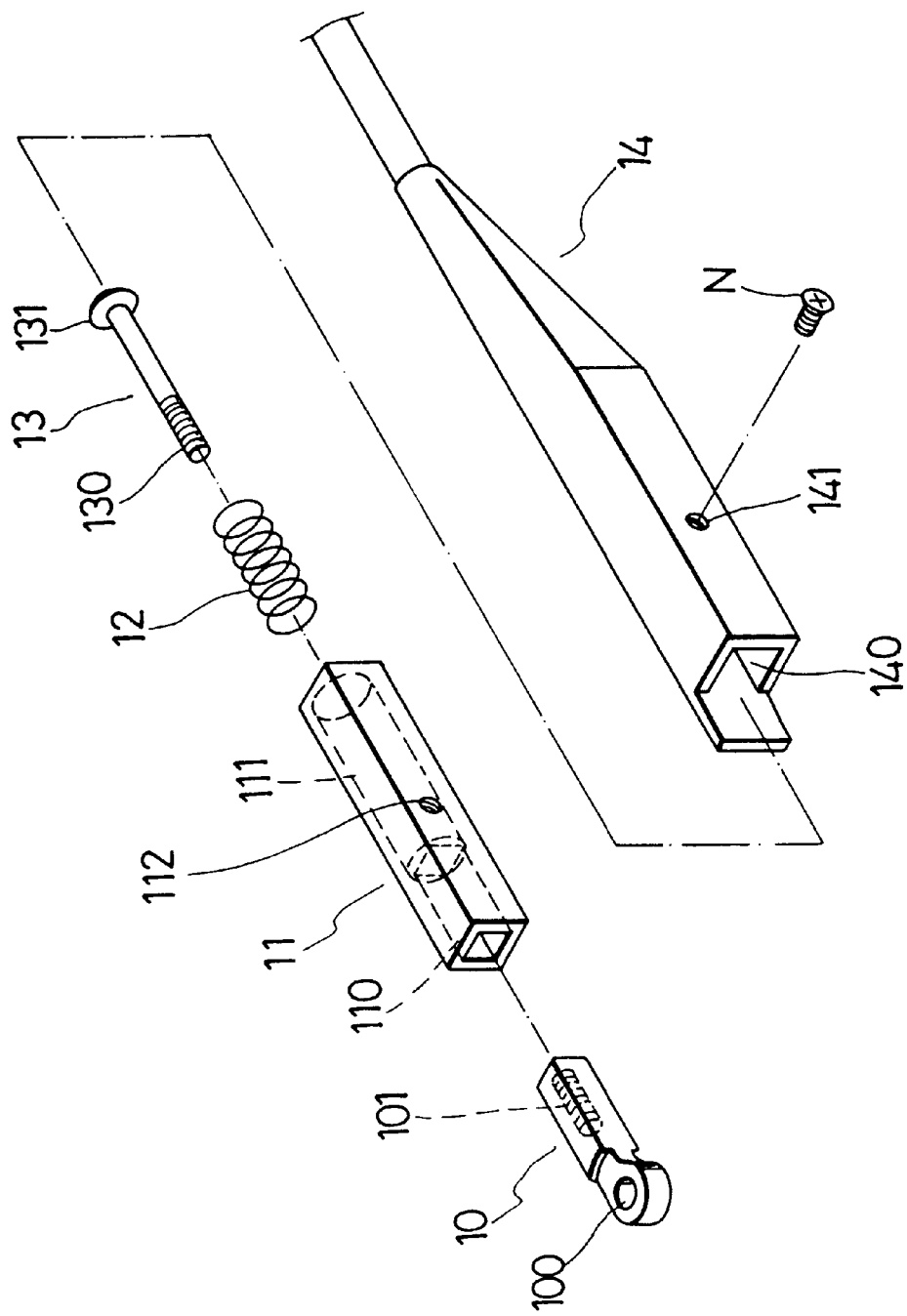
FIG. 1 is an exploded perspective view of a known conventional elastic temple for eyeglasses.
Figure 2:
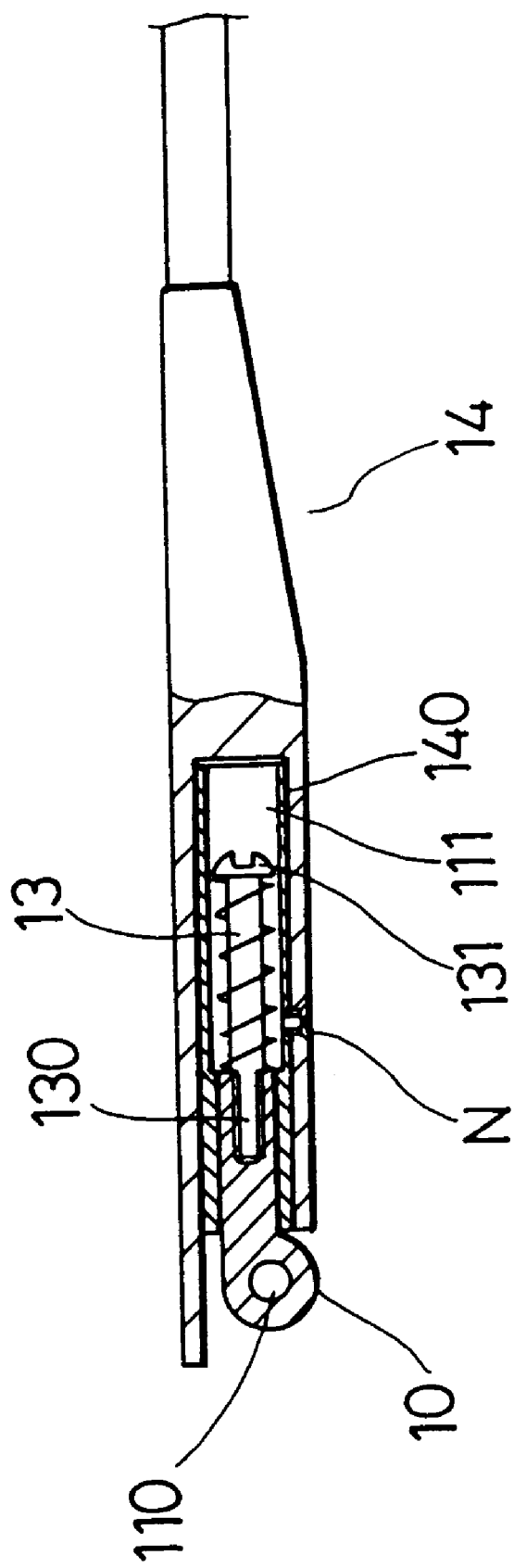
FIG. 2 is a cross-sectional view of the known conventional elastic temple for eyeglasses.
Figure 3:
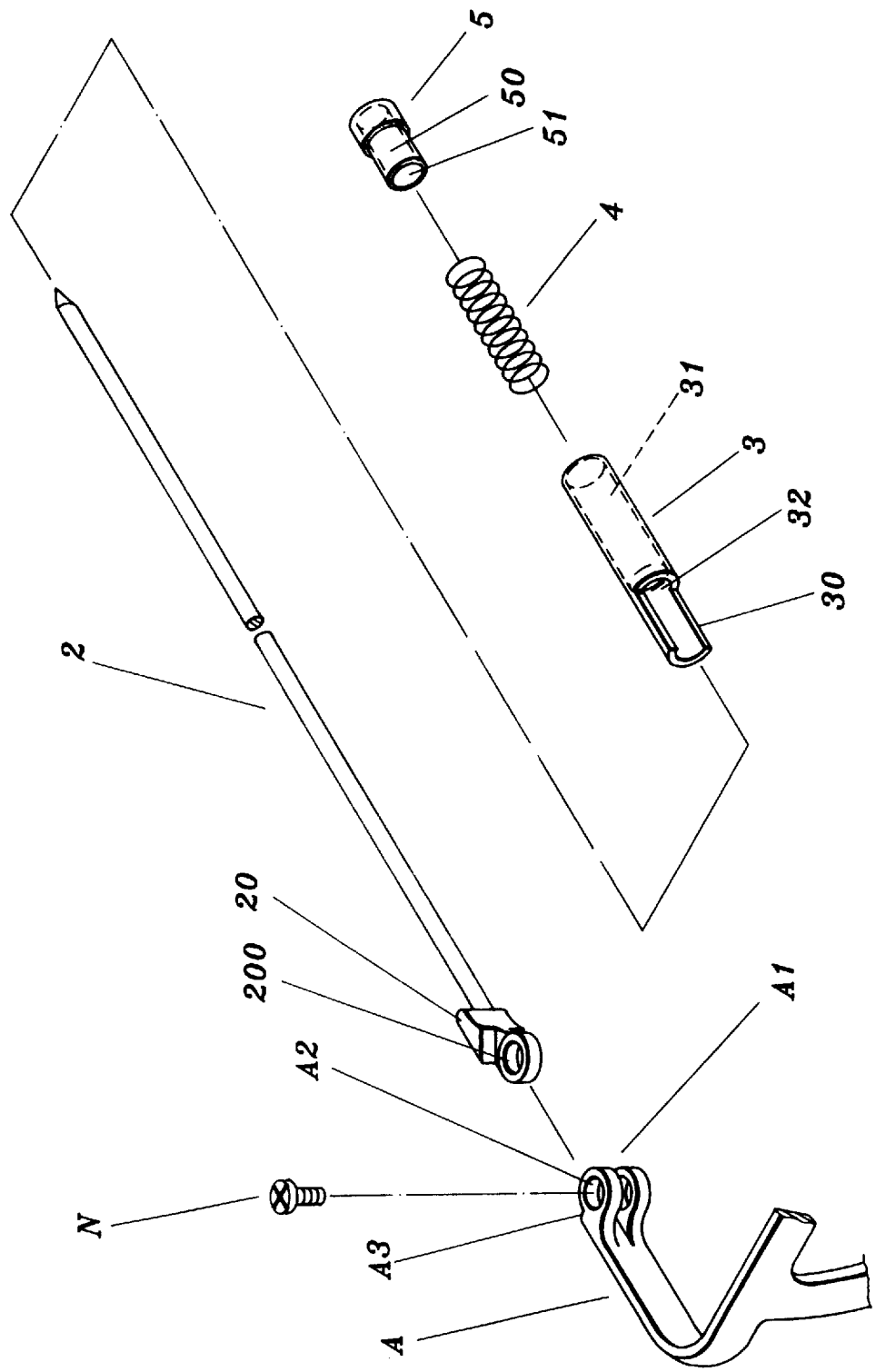
FIG. 3 is an exploded perspective view of an elastic temple for eyeglasses in the present invention.

A preferred embodiment of an elastic temple for eyeglasses in the present invention, as shown in FIG. 3, includes a temple body 2, a sleeve 3, a compression spring 4, and a fix member 5 as main components combined together.

The temple body 2 has a combine member 20 formed in a front end, and a pivot hole 200 provided in the combine member 20.

The sleeve 3 is inserted in the temple body 2, having a front hollow semi-cylindrical portion 30, a center passageway 31 in a rear tubular portion and an opening 32A formed in a wall 32 at the front end of the center hole 31. The inner diameter of semi-cylindrical portion 30 is smaller than the inner diameter of passageway 31, thus forming a wall therebetween in which opening 32 is formed therethrough.

The compression spring 4 fits around the temple body 2 and located in the center passageway 31 of the sleeve 3. A front end of spring 4 abuts wall 32.

The fixing member 5 fits around the temple body 2, pushing a rear end of the compression spring 4, having a front smaller outer diameter portion 50 and a center through hole 51.

Figure 4:
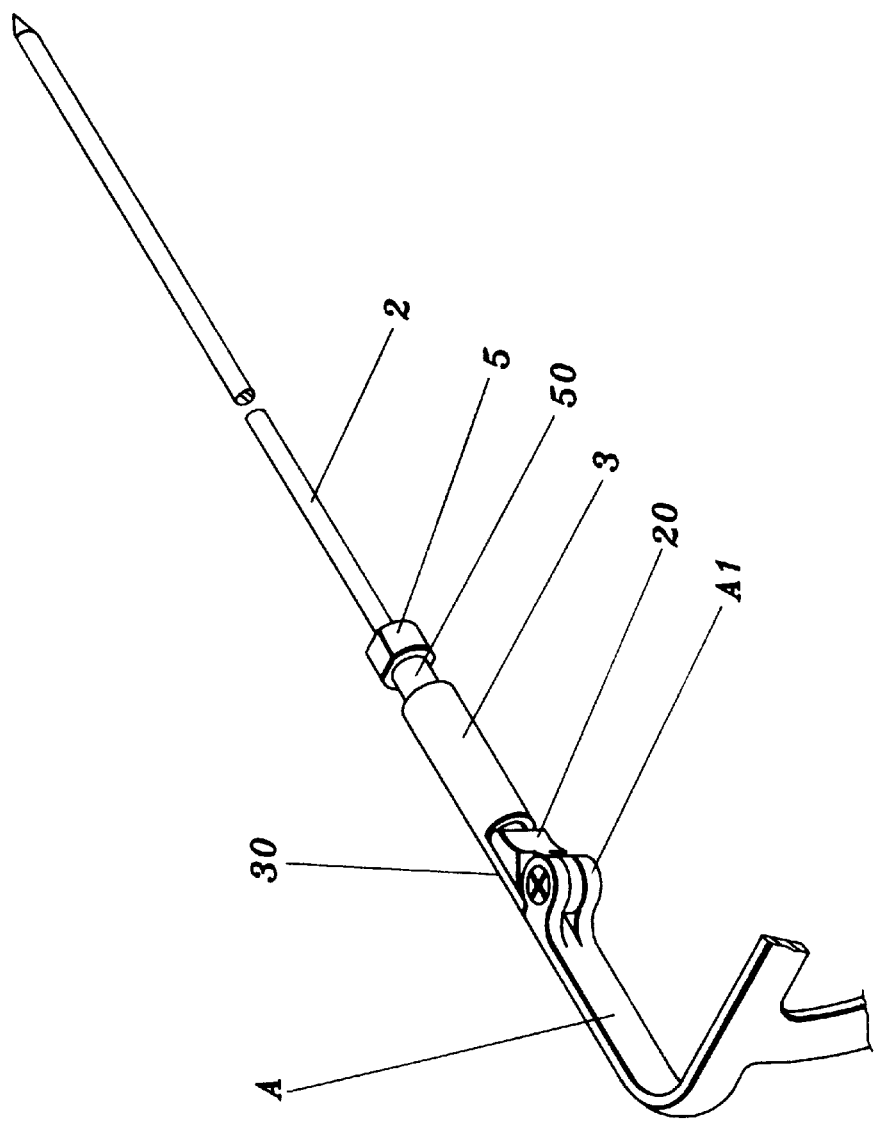
FIG. 4 is a perspective view of the elastic temple for eyeglasses in the present invention.
Figure 5:
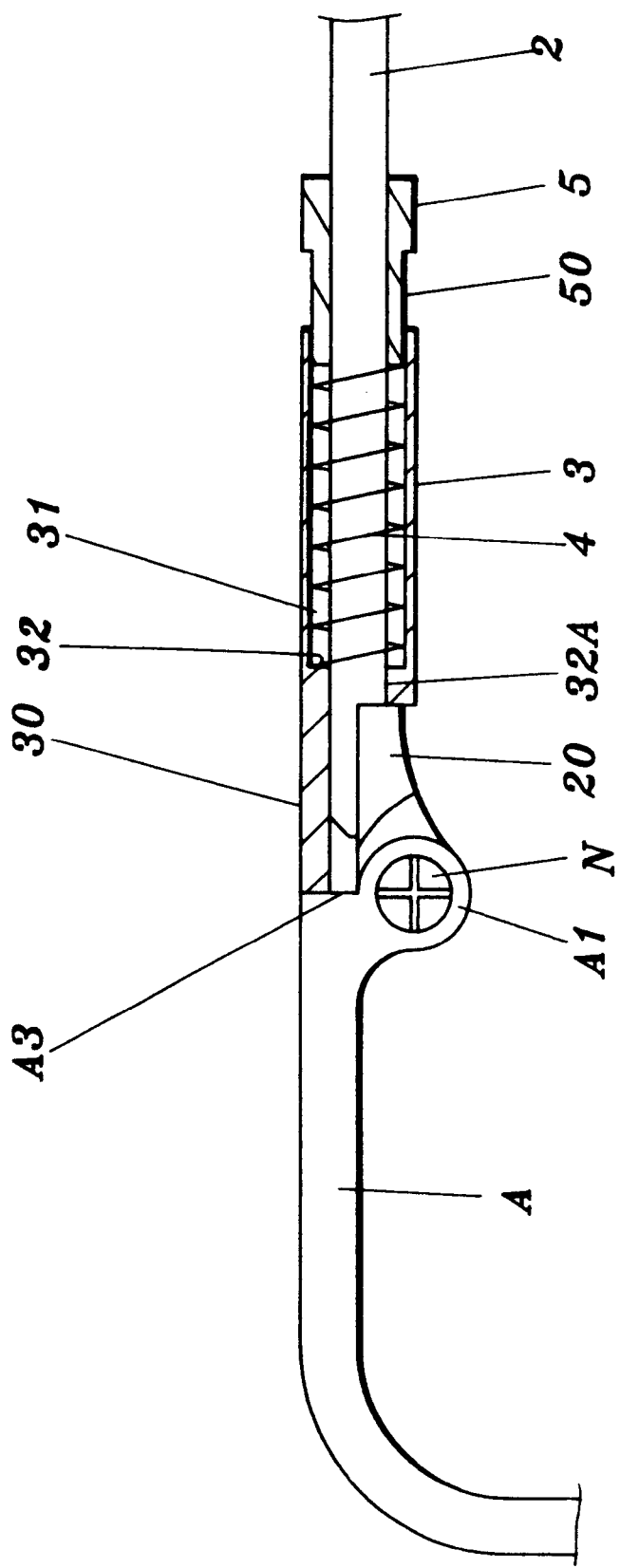
FIG. 5 is a cross-sectional view of the elastic temple for eyeglasses in the present invention; and, FIG. 6 is a cross-sectional view of the elastic temple for eyeglasses swung outward in the present invention.

In assembling, as shown in FIGS. 4 and 5, firstly the temple body 2 fits with its end through the opening 32 and the center passageway 31 of the sleeve 3, letting the front end of the sleeve 3 contact the combine member 20. Next, the compression spring 4 is made to fit around the temple body from its end, and placed in the center passageway 31 of the sleeve 3. Then the fix member 5 is made to fit round the temple body 2, with its front portion 50 contacting the rear end of the compression spring 4 and further extending in the center passageway 31 of the sleeve 3, and then fixed tightly with the temple body 2 by means of a pressing machine. Lastly, the hole 200 of the combine member 20 is aligned to the threaded hole A2 of the connect member A1 of a lens frame A and a screw N is used to combine the lens frame A with the temple body 2, with the front half circular portion 30 of the sleeve 3 urging the contact edge A3 of the lens frame A, finishing assemblage of the elastic temple in the present invention.

Figure 6:
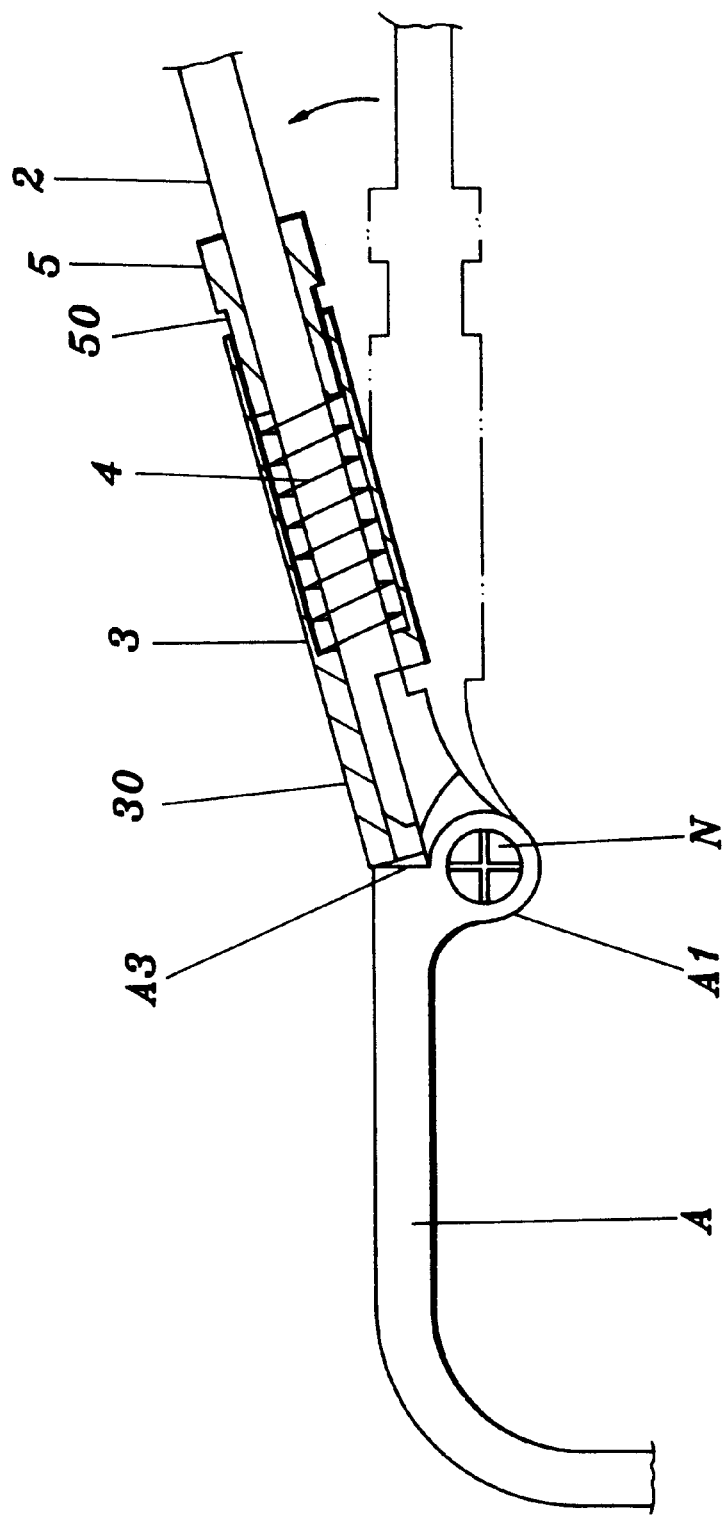

In wearing eyeglasses with the elastic temples of the invention, as shown in FIG. 6, the elastic temples can be swung elastically outward, with the front semi-cylindrical portion 30 of the sleeve 3 contacting the contact edge A3 of the lens frame A, and with the sleeve 3 pushed rearward to compress the compression spring 4. Thus, after the temple body 2 is swung outward, the compressed spring 4 will force the temple body 2 to swing back to the original position with its elasticity. Consequently, the elastic temples of the invention can comfortably adjust to various size faces of users.

The elastic temple in the invention has the following advantages:

1. Its structure is simple with fewer components than the known conventional temple, thus lowering its cost.

2. It is easily assembled together, thus saving time and manual labor.

3. It uses no screws for its assemblage, so no possibility of loosening or losing a screw.

While the preferred embodiment of the invention has been described above, it will be recognized and understood that various modifications may be made thereto and the appended claims are intended to cover all such modifications which may fall within the spirit and scope of the invention.

What is claimed is:

1. An elastic temple for eyeglasses comprising:

a temple body having a front combine member for pivotal attachment to a lens frame;

a single sleeve for receiving said temple body therethrough, said sleeve having a front hollow semi-cylindrical portion and a rear tubular portion, a front end of said front semi-cylindrical portion engageable with said combine member of said temple body, said rear tubular portion having a center passageway therethrough, the inner diameter of the semi-cylindrical portion being smaller than the inner diameter of the passageway, thereby defining a wall therebetween, an opening formed through the wall;

a compression spring fitting around said temple body, said spring being located in said center passageway of said sleeve, a front end of the spring abutting the wall;

a fixing member fitting around said temple body and secured tightly on said temple body, the member having a front portion sized to snugly fit in said center passageway of said sleeve, a front end of said front portion engaging a rear end of said compression spring; and said sleeve being movable between said combine member and said fixing member by the elasticity of said compression spring, and said elastic temple being swingable outwardly of the lens frame and back to its original position by means of the elasticity of said compression spring.

* * * * *